Oct. 23, 1951 — C. S. BRUSH — 2,572,440

LUBRICATOR FOR AIR LINES

Filed Oct. 23, 1948

INVENTOR.
CORNING STEVENS BRUSH.
BY
ATTORNEY.

Patented Oct. 23, 1951

2,572,440

UNITED STATES PATENT OFFICE 2,572,440

LUBRICATOR FOR AIR LINES

Corning Stevens Brush, Algonac, Mich., assignor to Monnier Brothers, Inc., Algonac, Mich., a corporation of Michigan Application October 23, 1948, Serial No. 56,160

6 Claims. (Cl. 184—55)

My invention relates to a new and useful improvement in a lubricator for air lines. Such lubricators are interposed in air lines so that the air passing through the air lines may, when it reaches the lubricator, receive a quantity of lubrication which is carried to the air operated tool, thus affording a means for lubricating the tool while in use. In such lubricators there is usually a manually operable valve whereby the operator may adjust the lubricator to deliver a certain quantity of lubricant to the tool. However, these lubricators are generally of different sizes as the different sized air operated tools which are to be used require different amounts of lubrication and regardless of the manually operable valve, it becomes necessary to change the lubricator when different size tools are to be used. Furthermore, the operator, when using a tool within the range of the lubricator used, will frequently adjust the manually operable valve and leave it at that adjustment, regardless of the air tool which is being used.

It is an object of the present invention to provide a lubricator so arranged and constructed that the lubricator automatically will adjust itself to assure the proper amount of lubricant to the tool which is being used so that it becomes possible to use tools of various sizes on this lubricator. Another objectionable feature to lubricators of this class is that a period of time elapses after the air tool has been put into operation before the lubricant is delivered by the air stream to the tool and it is an object to provide a lubricator which will avoid this objectionable feature and which will be so constructed and operate in such a manner that instant lubrication is possible with any volume of air flow.

Another object of the invention is the provision of a lubricator whereby the total air capacity, that is the volume of flow of air through the passage formed in the head of the lubricator, may be considerably increased. Another object of the invention is the provision in a lubricator of this class of a valve positioned in the air passage so arranged and constructed that it will always provide at opposite sides an unbalance so that incoming air will always enter the bowl or container and maintain the proper pressure in the bowl or container, while at the same time the valve will regulate the air passage through which the air flows.

Other objects will appear hereinafter.

It is recognized that various modifications, and changes may be made in the detail of structure illustrated without departing from the invention and the disclosure set out herein is considered one embodiment of the invention.

Forming a part of this application are drawings in which.

Figure 1:
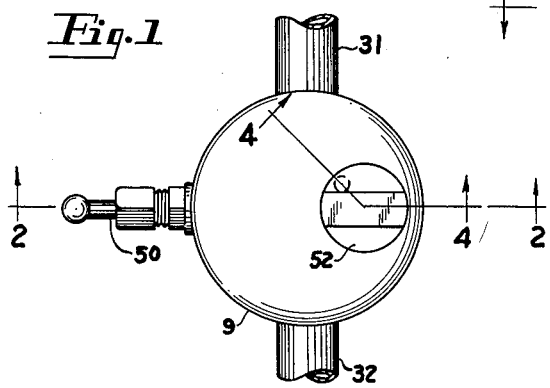
Fig. 1 is a top plan view of the invention.
Figure 2:
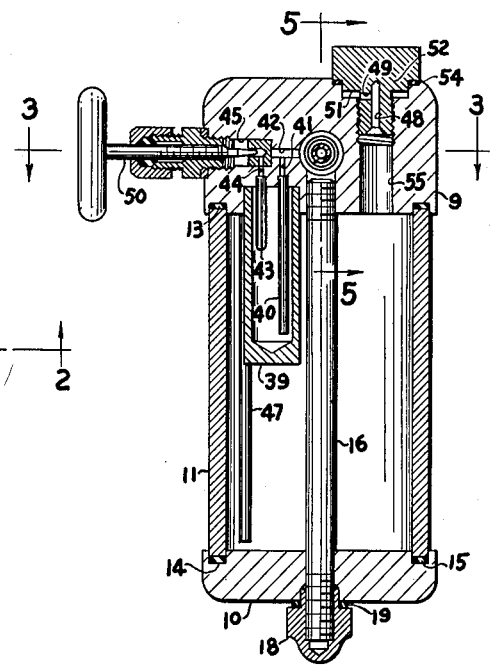
Fig. 2 is a central longitudinal vertical sectional view of the invention.

In the drawings I have shown the invention used with a lubricator embodying a cap 9, a base 10, and a bowl 11. The cap 9 is provided with an annular groove 12 in which seats a ring 13 of suitable sealing material against which bears the upper end of the bowl 11. An annular groove 14 is formed in the bottom 10 and seated in this annular groove is a ring 15 to provide a gasket formed of suitable sealing material and against which engages the lower end of the bowl 11. These parts are held in assembled relation by means of the bolt 16 which is threaded into the cap 9 and projects through the bottom 10 and which is provided with a nut 18 bearing against the sealing gasket 19. The bowl may be made from glass, plastic, or other suitable transparent material.

A slidable valve head 33 is adapted to engage the valve seat 34 formed on the end of the passage 35 which is formed in the cap 9. A coil spring 36 is positioned in this passage and engages the valve head at one of its ends and at its other end engages a screw 37 which serves as a closure for the passage 35. This passage 35 is in communication, through the passage 38, with the air passage 20 formed diametrically through the cap 9.

Positioned within the bowl is a container 39 into which projects one end of a tube 40, the opposite end communicating with the passage 41 formed in the cap 9, and which passage is in communication with the passage 42, this passage 42 communicating with the air passage 20. Projecting into the container 39 is a tube 43 the upper end of which communicates with the passage 44 which is in communication with the chamber 45 and which communication may be controlled by the needle valve 50. This chamber 45 communicates through the passage 46 with the upper end of the tube 47.

Figure 3:
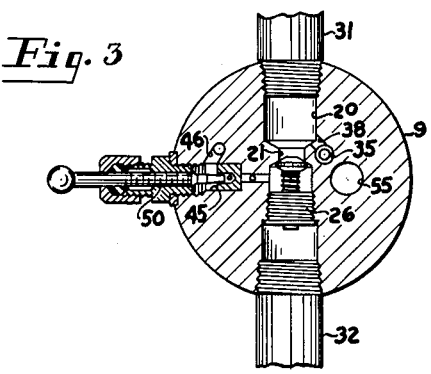
Fig. 3 is a sectional view taken on line 3—3 of Fig. 2.
Figure 4:
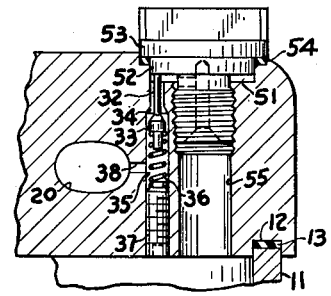
Fig. 4 is a fragmentary sectional view taken on line 4—4 of Fig. 1.

Formed in the cap 9 is a filler opening 55 which is closed by a plug 52 threaded into the upper end of the opening or passage 55. This plug 52 has a flange 53 adapted to bear against the ring 54 of sealing material. An axially directed passage 48 is formed in the plug communicating with the lateral passage 49 which is in communication with a chamber 51. Communicating with this chamber 51 is the passage 35. The passage 35, as shown in Fig. 3, communicates with the air passage 20 in front of the constricted portion 21 and a portion of the air passing through the pipe 31 into passage 20 is deflected to pass through the passage 38 into the passage 35 and thence from the chamber 51 downwardly through the passage 55 into the interior of the bowl 11 to establish air pressure above the lubricant which is contained within the bowl 11. As shown in Fig. 4, when the filler plug 52 is in closing position the valve 33 is held in open position or off of its seat. When this filler plug 52 is removed, this valve head 33 will move onto the seat 34 so as to close communication between the passage 55 and the air passage 20 so that no air under pressure can be delivered to the interior of the bowl 11 while it is being filled.

When the closure 52 is in the position shown in Fig. 4 and the structure is being operated, the air passing through the air passage will set up a syphonage through the passage 42 and serve to draw lubricant through the tube 40 from the container 39 so that lubricant will thus be delivered to the air under pressure which is being delivered to the air operated tool. The liquid lubricant will enter the container 39 by passing upwardly through the tube 47 into the chamber 45 and thence through the passage 44 and the tube 43 from which it will drop into the container 39.

The structure thus far described does not constitute a part of the present invention, but is covered in co-pending applications and the invention relates primarily to the structure about to be described.

The co-pending applications referred to are applications Serial No. 56,158 and Serial No. 56,159, both filed October 23, 1948.

Figure 5:
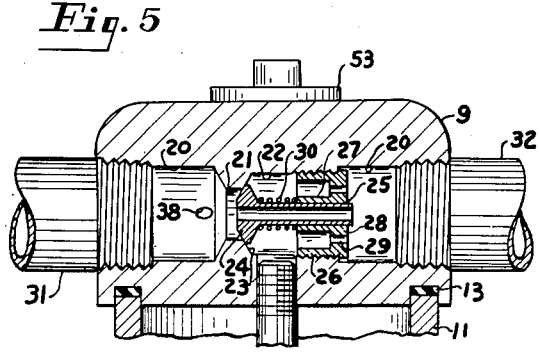
Fig. 5 is an enlarged fragmentary sectional view taken at right angles to Fig. 2 on line 5—5 of Fig. 2.

I have shown in Fig. 5 the air passage 20 constricted as at 21 and this constricted passage communicates with a slightly enlarged portion 22. The end wall of the portion 22 is inclined to provide a valve seat 23 against which engages a valve 24. Extending centrally from this valve head 24 is a tube 25. Threaded into this portion 22 is a guide sleeve 26 which is closed at one end by the closure or bottom 28 through which are formed the openings or passages 29. The tube 25 extends through the sleeve 27 which is centrally of the fitting 26, this fitting 26 serving to form a cup-shaped member with the guide sleeve 27 extended centrally thereof. Embracing the tube 25 is a coil spring 30, one end of which bears against the valve head 24 and the other end of which bears against the end of the guide sleeve 27.

In air line lubricators of this class it is customary to have a constricted portion such as the constricted portion 21. However, by using the valve 24 it becomes possible to enlarge the constricted portion 21 over that which could be used were the valve 24 not present. In use, the air delivered through the pipe 31 will force the valve 24 off of its seat; the spring 30 being a light spring and permitting this movement. Of course, a portion of the air delivered through the pipe 31 will pass through the tube 25 and that which passes around the valve head 24 will pass through the openings 29. For proper and efficient operation of a lubricator of this type it is desired that there be an unbalance between the air pressure on one side of the constricted portion and on the other side the air pressure on the side with which the passage 38 communicates being slightly higher than that on the other side of the constricted portion. When a lubricator of this class is used without having the valve 24 present, this unbalanced relationship will be maintained when the air tool is of a sufficient size to consume the air which passes through the constricted portion. However, when it is desired to reduce the size of the air tool or use an air tool which will consume less air a sort of static condition develops because the pressure on both sides of the constricted portion becomes substantially the same, thus considerably diminishing the amount of lubricant which would be drawn through the pipe 32 to the air tool. With the present invention, the spring actuated valve 24 automatically adjusts itself to such a position that there will be the unbalanced condition referred to. When the air tool in use requires a large amount of air the valve 24 will move off of its seat a greater distance than when the device is used with an air tool requiring a smaller amount of air, and in both instances the proper lubrication will be delivered to the air which is delivered to the air tool. Thus, it becomes possible to use air tools of various capacities without changing the lubricator; moreover, by forming the constricted portion 21 of larger diameter than would be the case were the valve 24 not to be used, the valve 24, will of course, through its movements adjust the size of the opening through which the air may pass to the outlet delivery pipe 32.

What I claim is:

1. In an air line lubricator of the class described having a bowl for reception of lubricants and a cap on said bowl having an air passage formed therethrough provided with a constricted portion intermediate its ends, and communicating on opposite sides of said constricted portion with said bowl, said constricted portion having an inlet end and an outlet end; a valve seat formed on the outlet end of said constricted portion; a valve positioned in said air passage and adapted for engaging said valve seat, said valve being moveable toward and away from said valve seat; and a spring for normally urging said valve toward said seat, there being a passage formed through said valve.

2. In an air line lubricator of the class described, a lubricant containing bowl; a head on said bowl having an air passage formed therethrough for conducting air under pressure therethru, said passage having an entry end and an outlet end and being provided intermediate its ends with a constricted portion, said passage communicating at the entry end of said passage with the interior of said bowl and communicating at the outlet end of said passage beyond said constriction with the interior of said bowl; and a spring pressed valve positioned between said points of communication and normally spring pressed into closing position against the direction of travel of the air through said passage, there being a passage within said air passage for travel of air past said valve when said valve is in closed position.

3. In an air line lubricator of the class described, a lubricant containing bowl; a head on said bowl having an air passage formed therethru for conducting air under pressure therethru, said passage having an entry end and an outlet end and being provided, intermediate its ends, with a constricted portion, said passage communicating at one side of said constricted portion with the interior of said bowl and communicating at the other side of said constricted portion with the interior of said bowl; and a spring pressed valve positioned in said passage between said constricted portion and one of said points of communication and normally spring-pressed into closing position against the direction of travel of air thru said passage, there being a passage for travel of air past said valve when said valve is moved to closed position.

4. In an air line lubricator of the class described, a lubricant containing bowl; a head on said bowl having an air passage formed therethru for conducting air under pressure therethru, said passage having an entry end and an outlet end and being provided, intermediative ends, with a constricted portion, said passage communicating at one side of said constricted portion with the interior of said bowl and communicating at the other side of said constricted portion with the interior of said bowl; and a spring pressed valve positioned in said passage between said constricted portion and one of said points of communication and normally spring-pressed into closing position against the direction of travel of air thru said passage, there being a passage formed thru said valve.

5. In an air line lubricator of the class described, a lubricant containing bowl; a head on said bowl having an air passage formed therethru for conducting air under pressure therethru, said passage having an entry end and an outlet end and being provided, intermediative ends, with a constricted portion, said constricted portion having an inlet end and an outlet end, said passage, between its entry end and said constricted portion, communicating with the interior of said bowl and communicating with the interior of said bowl between the outlet end of said passage and the outlet end of said constricted portion; and a valve positioned in said passage between said last named point of communication and the outlet end of said constricted portion and movable to open and closed position and movable, upon moving to closed position, toward the outlet end of said constricted portion; and a spring normally urging said valve towards said outlet end of said constricted portion there being a passage for travel of air past said valve upon movement of said valve the maximum distance toward said outlet end.

6. In an air line lubricator of the class described, a lubricant containing bowl; a head on said bowl having an air passage formed therethru for conducting air under pressure therethru, said passage having an entry end and an outlet end and being provided, intermediative ends, with a constricted portion, said constricted portion having an inlet end and an outlet end, said passage, between its entry end and said constricted portion, communicating with the interior of said bowl and communicating with the interior of said bowl between the outlet end of said passage and the outlet end of said constricted portion; and a valve positioned in said passage between said last named point of communication and the outlet end of said constricted portion and movable to open and closed position and movable, upon moving to closed position, toward the outlet end of said constricted portion; and a spring normally urging said valve towards said outlet end of said constricted portion, there being a passage formed thru said valve for permitting flow of air therethru after the same has passed thru the passage in said constricted portion.

CORNING STEVENS BRUSH.

REFERENCES CITED

The following references are of record in the file of this patent:

UNITED STATES PATENTS

| Number | Name | Date |
|---|---|---|
| 1,167,593 | O'Donnell | Jan. 11, 1916 |
| 2,304,644 | Heftler | Dec. 8, 1942 |
| 2,442,777 | Norgren | June 8, 1948 |